US011227631B2

(12) United States Patent
Schmidt et al.

(10) Patent No.: US 11,227,631 B2
(45) Date of Patent: Jan. 18, 2022

(54) PARALLEL MICRO-ACTUATOR SSW WRITING

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Thorsten Schmidt, Livermore, CA (US); Gary W. Calfee, Santa Clara, CA (US); Gabor Szita, Mountain View, CA (US); Hieu Pham, San Jose, CA (US)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 16/882,956

(22) Filed: May 26, 2020

(65) Prior Publication Data

US 2020/0286513 A1 Sep. 10, 2020

Related U.S. Application Data

(63) Continuation of application No. 15/919,123, filed on Mar. 12, 2018, now Pat. No. 10,665,257.

(51) Int. Cl.
*G11B 5/09* (2006.01)
*G11B 5/596* (2006.01)
*G11B 5/55* (2006.01)
*G11B 5/29* (2006.01)

(52) U.S. Cl.
CPC ........... *G11B 5/59666* (2013.01); *G11B 5/29* (2013.01); *G11B 5/5521* (2013.01); *G11B 5/5965* (2013.01); *G11B 5/59627* (2013.01)

(58) Field of Classification Search
None
See application file for complete search history.

(56) References Cited

U.S. PATENT DOCUMENTS

| 4,745,497 | A | * | 5/1988 | Ozawa | G11B 21/085 360/77.07 |
|---|---|---|---|---|---|
| 5,838,512 | A | * | 11/1998 | Okazaki | G11B 5/012 360/51 |
| 5,995,316 | A | * | 11/1999 | Stich | G11B 5/59627 360/77.04 |
| 6,342,986 | B2 | * | 1/2002 | Nguyen | G11B 5/012 360/53 |
| 6,522,494 | B1 | * | 2/2003 | Magee | G11B 5/59633 360/75 |
| 7,218,471 | B2 | | 5/2007 | Meyer | |

(Continued)

*Primary Examiner* — Peter Vincent Agustin
(74) *Attorney, Agent, or Firm* — Kim & Stewart LLP (57) ABSTRACT

A self servo-write process in performed on two or more recording surfaces simultaneously. In a dual-stage servo system, a first fine positioning servo system that includes a first microactuator independently controls the position of a first read/write head over a first recording surface of a hard disk drive, while a second fine positioning servo system that includes a second microactuator independently controls the position of a second read/write head over a second recording surface of the hard disk drive.

18 Claims, 7 Drawing Sheets

(56) References Cited

U.S. PATENT DOCUMENTS

| | | | |
|---|---|---|---|
| 7,843,662 B1* | 11/2010 | Weerasooriya | G11B 5/59661 |
| | | | 360/78.14 |
| 10,665,257 B2* | 5/2020 | Schmidt | G11B 5/59627 |
| 2003/0103296 A1* | 6/2003 | Jang | G11B 5/4853 |
| | | | 360/265.9 |
| 2004/0160696 A1 | 8/2004 | Meyer | |
| 2012/0182640 A1* | 7/2012 | Ho | G11B 19/044 |
| | | | 360/46 |
| 2019/0279675 A1* | 9/2019 | Schmidt | G11B 5/29 |
| 2020/0286513 A1* | 9/2020 | Schmidt | G11B 5/29 |

* cited by examiner

PARALLEL MICRO-ACTUATOR SSW WRITING

CROSS-REFERENCE TO RELATED APPLICATION

This application is a continuation of U.S. patent application Ser. No. 15/919,123, filed on Mar. 12, 2018, the entire contents of each of which are incorporated herein by reference.

BACKGROUND

In a typical hard disk drive (HDD), servo sectors on the disk are used to provide position information about the location of a magnetic head over a disk surface. A common approach for writing such servo information on one or more disk surfaces in an HDD is referred to as spiral-based self-servo writing, or spiral-based SSW. According to this approach, multiple spiral-shaped servo information patterns (or "servo spirals") are written on at least one disk surface prior to the SSW process. During the SSW process, a magnetic head of the HDD is positioned relative to a disk surface based on timing and position information in the servo spirals, so that the final servo information (the servo sectors) can be written on the disk surface by the magnetic head. In this way, the HDD itself writes the servo sectors on each disk surface.

Since each disk surface of modern HDDs typically include many thousands of tracks, the processing time for an HDD to write servo sectors in this way can be multiple days. Since longer processing time increases the overall cost of an HDD, there is a need in the art for techniques that can reduce the duration of the SSW process.

SUMMARY

One or more embodiments provide systems and methods for performing an SSW process on two or more recording surfaces simultaneously. Specifically, in a dual-stage servo system, a first fine positioning servo system that includes a first microactuator independently controls the position of a first read/write head over a first recording surface of a hard disk drive, while a second fine positioning servo system that includes a second microactuator independently controls the position of a second read/write head over a second recording surface of the hard disk drive.

A method of writing servo information in a disk drive that includes a voice-coil motor configured for coarse positioning of a first magnetic head and a second magnetic head, according to an embodiment, comprises positioning the first magnetic head over a first disk surface with the voice-coil motor, a first microactuator coupled to the voice-coil motor, and a first servo controller that receives a first position signal from the first magnetic head and transmits a first correction signal based on the first position signal to the first microactuator; while positioning the first magnetic head over the first disk surface, writing servo information for a first track on the first disk surface with the first magnetic head and positioning the second magnetic head over a second disk surface a second microactuator coupled to the voice-coil motor, and a second servo controller that receives a second position signal from the second magnetic head and transmits a second correction signal based on the second position signal to the second microactuator; and while positioning the second magnetic head over the second disk surface, writing servo information for a second track on the second disk surface with the second magnetic head.

BRIEF DESCRIPTION OF THE DRAWINGS

So that the manner in which the above recited features of embodiments can be understood in detail, a more particular description of embodiments, briefly summarized above, may be had by reference to the appended drawings. It is to be noted, however, that the appended drawings illustrate only typical embodiments and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
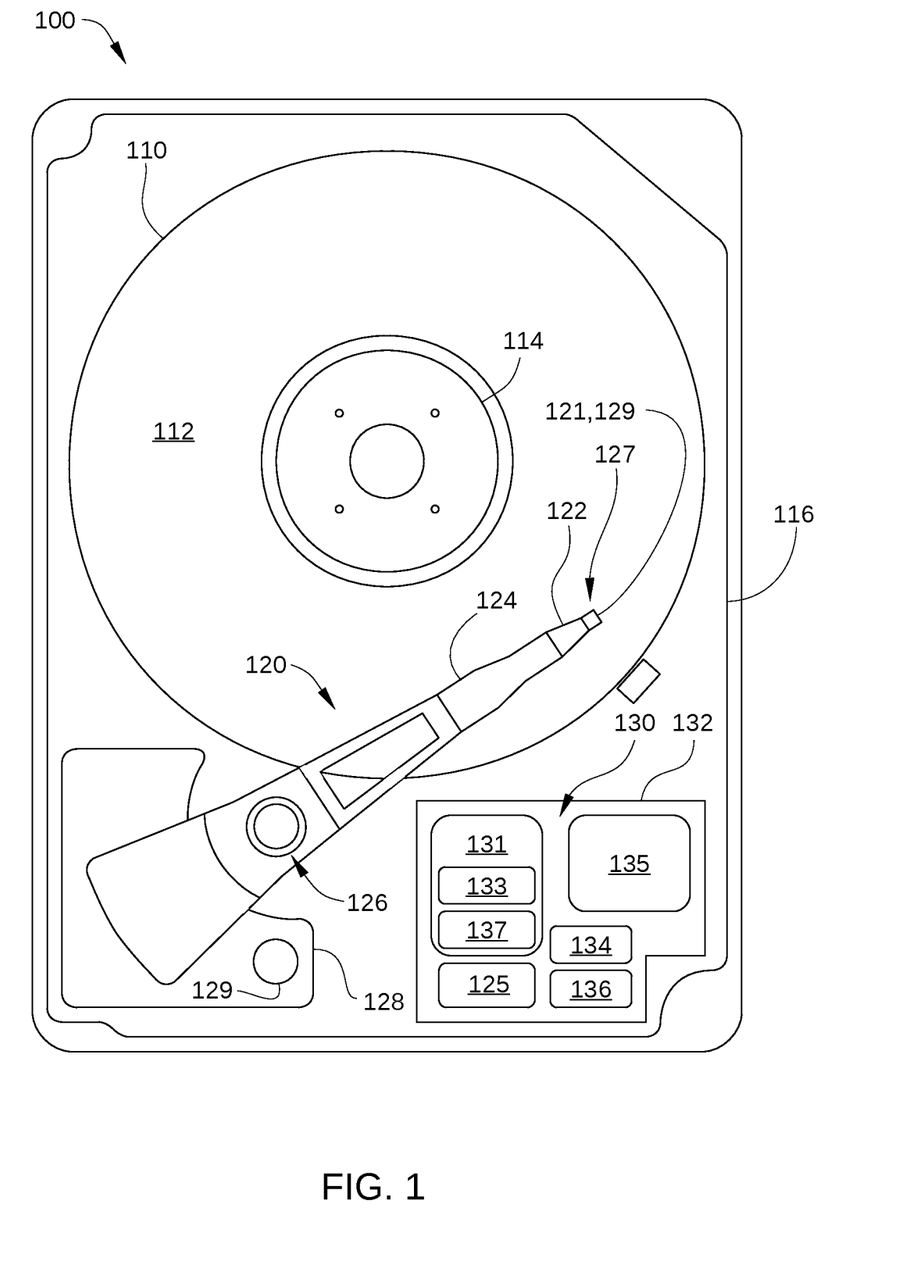
FIG. 1 is a schematic view of an exemplary hard disk drive, according to one embodiment.

FIG. 1 is a schematic view of an exemplary hard disk drive (HDD) 100, according to one embodiment. For clarity, HDD 100 is illustrated without a top cover. HDD 100 includes multiple storage disks 110 (only one of which is visible in FIG. 1) that each include one or two recording surfaces 112 on which a plurality of concentric data storage tracks are disposed. Storage disks 110 are coupled to and rotated by a spindle motor 114 that is mounted on a base plate 116. An actuator arm assembly 120 is also mounted on base plate 116, and includes multiple sliders 121 (only one of which is visible in FIG. 1), each mounted on a flexure arm (also referred to as a suspension) 122 with a magnetic read/write head 127 that reads data from and writes data to the data storage tracks of an associated recording surface 112. Each flexure arm 122 is attached to an actuator arm 124 that rotates about a bearing assembly 126. Voice coil motor 128 moves all of the multiple sliders 121 radially relative to a recording surface 112 of a storage disk 110, thereby providing coarse radial positioning of read/write head 127 over a desired concentric data storage track. Spindle motor 114, read/write head 127, and voice coil motor 128 are coupled to electronic circuits 130, which are mounted on a printed circuit board 132.

Fine radial positioning of each read/write head 127 is accomplished with a respective microactuator 129. The microactuator 129 for each read/write head 127 is mechanically coupled to the actuator arm 124 that corresponds to the read/write head 127. In some embodiments, each microactuator 129 is mounted on a respective flexure arm 122, at a gimbal between the respective flexure arm 122 and the corresponding slider 122, or on the slider 122 itself. Each microactuator 129 typically includes one or more piezoelectric elements and is configured to move a corresponding read/write head 127 radially a small distance, for example on the order of a few tens of nanometers. When employed together, microactuators 129 and voice coil motor 128 are sometimes referred to as dual-stage actuators, where voice coil motor 128 is the prime mover and each microactuator 129 is a second-stage actuator. Dual-stage actuators enable the servo system of HDD 100 to attain more accurate tracking control. Furthermore, according to various embodiments described herein, independently controlling the position of two or more of read/write heads 127 via microactuators 129 enables a significant reduction in the write time of servo wedges during a self servo-write (SSW) process. One embodiment of dual-stage actuators implemented in HDD 100 is illustrated in FIG. 2.

Figure 2:
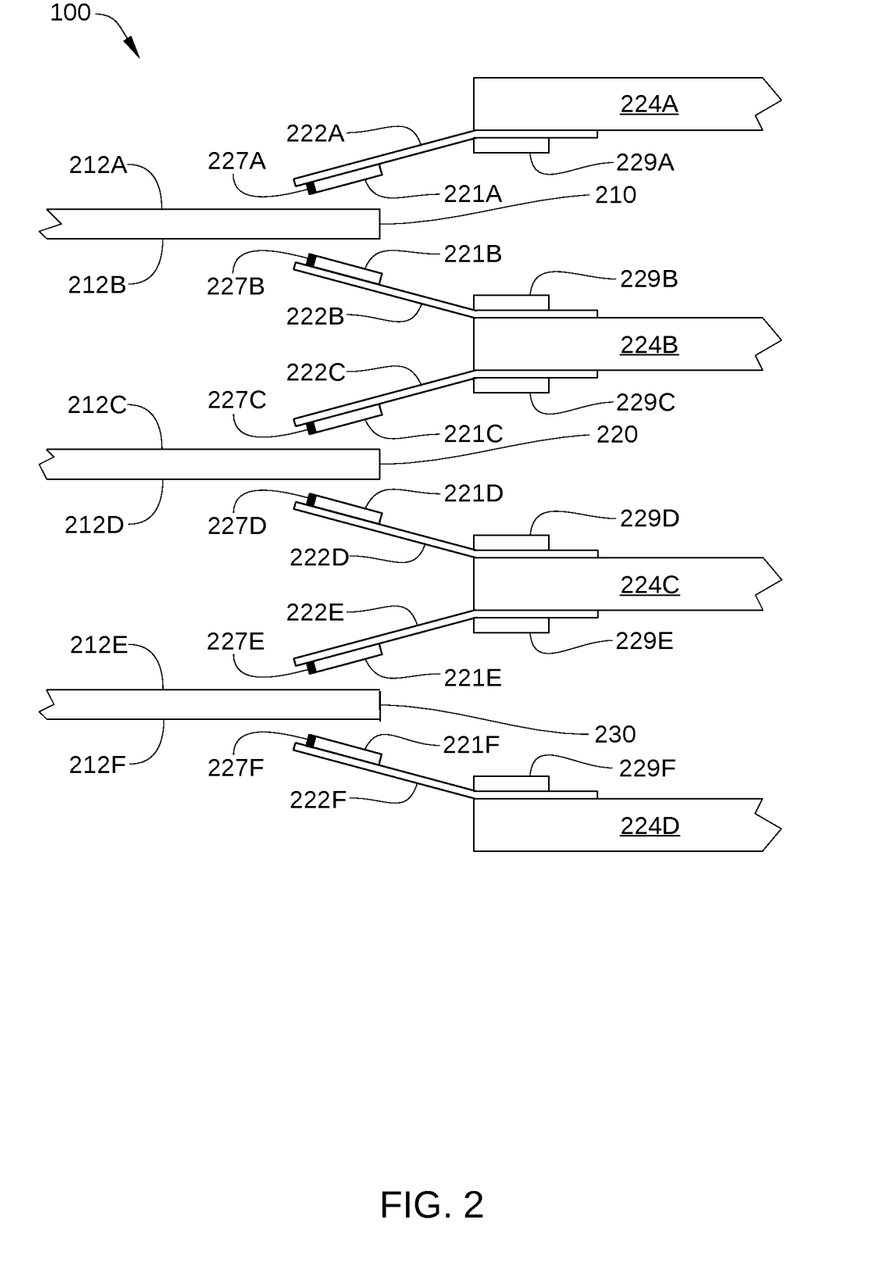
FIG. 2 schematically illustrates a partial side-view of the multiple storage disks and multiple dual-stage actuators of a hard disk drive, according to an embodiment.

FIG. 2 schematically illustrates a partial side-view of the multiple storage disks 210, 220, and 230 (referred to collectively herein as storage disks 110) and multiple dual-stage actuators of HDD 100, according to an embodiment. As shown, HDD 100 is configured with multiple storage disks 110, each having two recording surfaces, and multiple read/write heads 227A-227F that each respectively correspond to a one of these recording surfaces. Specifically, in the embodiment illustrated in FIG. 2, HDD 100 includes a storage disk 210 with recording surfaces 212A and 212B, a storage disk 220 with recording surfaces 212C and 212D, and a storage disk 230 with recording surfaces 212E and 212F. HDD 100 further includes read/write heads 227A-227F (referred to collectively herein as read/write heads 127) that each correspond to one of recording surfaces 212A-212F. Thus, read/write head 227A reads data from and writes data to corresponding recording surface 212A, read/write head 227B reads data from and writes data to corresponding recording surface 212B, and so on.

Read/write heads 227A-227F are disposed on sliders 221A-221F, respectively, and sliders 221A-221F are mounted on flexure arms 222A-222F, respectively. As shown, flexure arm 222A is coupled to an actuator arm 224A, flexure arms 222B and 222C are coupled to an actuator arm 224B, flexure arms 222D and 222E are coupled to an actuator arm 224C, and flexure arm 222F is coupled to an actuator arm 224D. Actuator arms 224A-224D are referred to collectively herein as actuator arms 124. In the embodiment illustrated in FIG. 2, microactuators 229A-229F (referred to collectively herein as microactuators 129) are disposed at a base of flexure arms 222A-222F, respectively, i.e., at an end of one of actuator arms 124. Alternatively, in some embodiments, microactuators 229A-229F can be disposed proximate sliders 221A-221F, respectively, i.e., at a tip of flexure arms 222A-222F, respectively. In either case, each of microactuators 129 compensate for perturbations in the radial position of sliders 121, so that read/write heads 127 follow the proper data track on recording surfaces 112. Thus, microactuators 129 can compensate for vibrations of the disk, inertial events such as impacts to HDD 100, and irregularities in recording surfaces 112. In embodiments in which microactuators 129 are disposed proximate sliders 221, each of microactuators 129 can include a gimbal microactuator that enables sliders 121 to compensate for perturbations in the radial direction by pitching and rolling. According to various embodiments and as described in greater detail below, independent position control of two or more of read/write heads 127 via microactuators 129 enables a significant reduction in the write time of servo wedges during an SSW process.

Returning to FIG. 1, electronic circuits 130 include a read channel 137, a microprocessor-based controller 133, random-access memory (RAM) 134 (which may be a dynamic RAM and is used as one or more data buffers) and/or a flash memory device 135, and in some embodiments a flash manager device 136. In some embodiments, read channel 137 and microprocessor-based controller 133 are included in a single chip, such as a system-on-chip (SoC) 131. HDD 100 further includes a motor-driver chip 125 that accepts commands from microprocessor-based controller 133 and drives spindle motor 114, voice coil motor 128, and microactuators 129. Read/write channel 137 communicates with read/write heads 127 via a preamplifier (not shown) that may be mounted on a flex-cable that is itself mounted on either base plate 116, one of actuator arms 124, or both. Electronic circuits 130 and motor-driver chip 125 are described below in greater detail in conjunction with FIG. 3.

Figure 3:
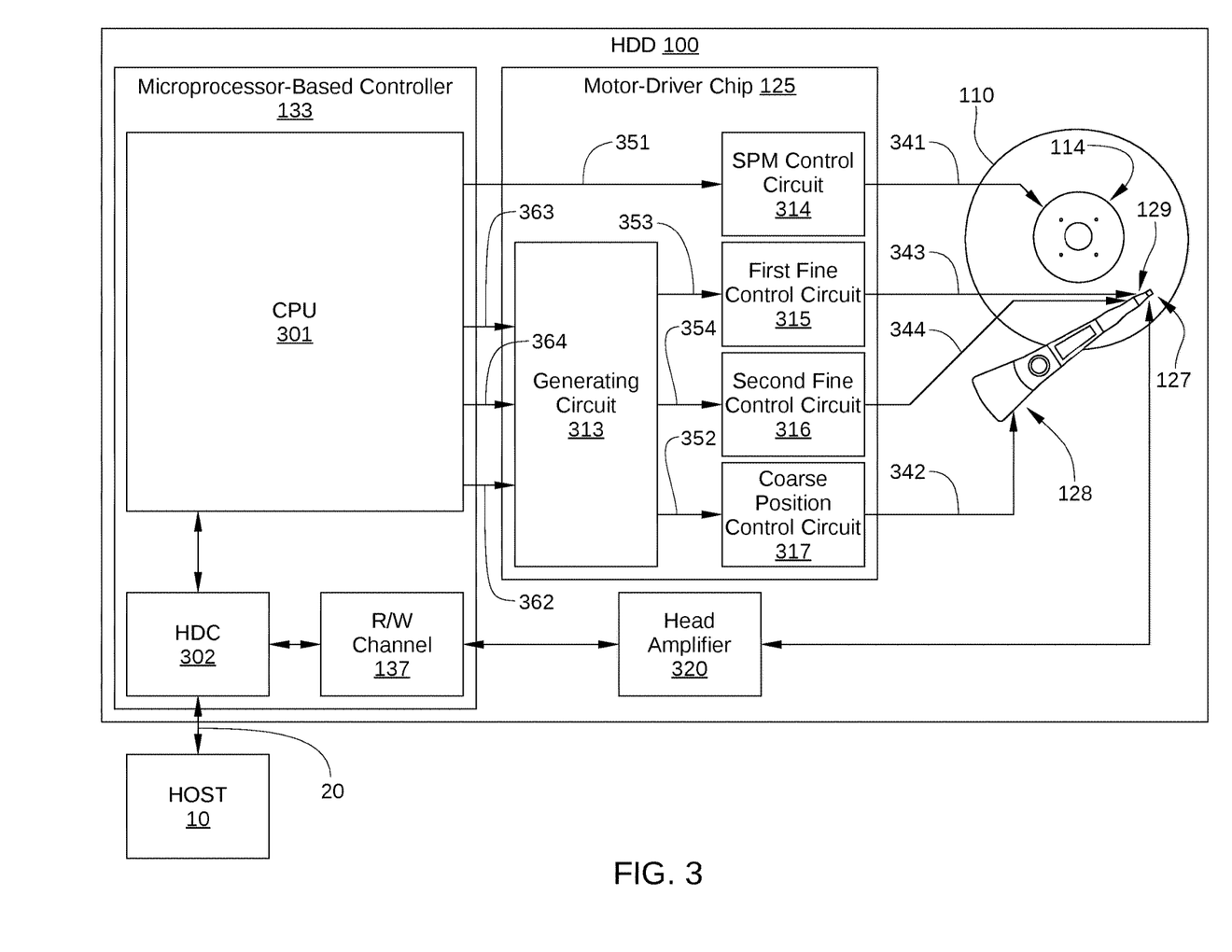
FIG. 3 illustrates an operational diagram of a hard disk drive, with elements of electronic circuits and a motor-driver chip shown configured according to one embodiment.

FIG. 3 illustrates an operational diagram of HDD 100, with elements of electronic circuits 130 and motor-driver chip 125 shown configured according to one embodiment. HDD 100 is connected to a host 10, such as a host computer, via a host interface 20, such as a serial advanced technology attachment (SATA) bus or SAS. As shown, microprocessor-based controller 133 includes a central processing unit (CPU) 301 or other processor, a hard disk controller (HDC) 302, and read/write channel 137, while motor-driver chip 125 includes a generating circuit 313, a spindle motor (SPM) control circuit 314, a first fine control circuit 315, a second fine control circuit 316, and a coarse position control circuit 317. HDD 100 further includes a head amplifier (or preamplifier) 320 that is typically mounted on one of actuator arms 124. Head amplifier 320 supplies a write signal (e.g., current) to any of read/write heads 127 in response to write data input from the read/write channel 137. In addition, head amplifier 320 amplifies a read signal output from a read/write head 127 and transmits the read amplified read signal to read/write channel 137.

CPU 301 controls HDD 100, for example according to firmware stored in flash memory device 135 or another nonvolatile memory. For example, CPU 301 performs control functions for various processes, including a read process, a write process, and an SSW process. CPU 301 performs such processes in conjunction with HDC 302, read/write channel 137, read/write heads 127, recording surfaces 112, and motor-driver chip 125. Read/write channel 137 is a signal processing circuit that encodes write data input from HDC 302 and outputs the encoded write data to head amplifier 320. Read/write channel 137 also decodes a read signal transmitted from head amplifier 320 into read data that are output to HDC 302. In some embodiments, read/write channel 137 includes a single read channel and a single write channel, whereas in other embodiments, read/write channel includes multiple write channels and/or multiple read channels. HDC 302 receives/transmits data to/from host 10 host via interface 20. In some embodiments, the components of microprocessor-based controller 133 (e.g., CPU 301, HDC 302, and read/write channel 137) are implemented as a one-chip integrated circuit (i.e., as an SoC). Alternatively, one or more of CPU 301, HDC 302, and read/write channel 137 can each be implemented as a separate chip.

Motor-driver chip 125 drives the spindle motor 114, a coarse position actuator (that includes voice coil motor 128, bearing assembly 126, and actuator arms 124), and microactuators 129 in accordance with control signals from CPU 301. Specifically, SPM control circuit 314 generates a drive signal 341 (a drive voltage or a drive current) in response to a control signal 351 received from the CPU 16, and supplies the control signal to spindle motor 114. In this way, spindle motor 114 rotates storage disks 110. In addition, coarse position control circuit 317 generates a drive signal 342 (drive voltage or drive current) in accordance with a received coarse position control signal 352, and supplies the coarse position control signal 342 to the coarse position actuator (voice coil motor 128). In this way, the coarse position actuator coarsely positions read/write heads 127 radially with respect to recording surfaces 112. Further, first fine control circuit 315 generates a drive signal 343 (drive voltage or drive current) in accordance with a received fine position control signal 353, and supplies drive signal 343 to a first fine position actuator (one of microactuators 129). In this way, the first fine position actuator performs fine positioning of a first read/write head 127 radially with respect to a first recording surface 112. Similarly, second fine control circuit 316 generates a drive signal 344 (drive voltage or drive current) in accordance with a received fine position control signal 354, and drive signal 344 to a second fine position actuator (another of microactuators 129). In this way, the second fine position actuator performs fine positioning of a second read/write head 127 radially with respect to a second recording surface 112. Generating circuit 313 generates coarse position control signal 352 in response to a control signal 362 from CPU 301, fine position control signal 353 in response to a control signal 363 from CPU 301, and fine position control signal 354 in response to a control signal 364 from CPU 301.

A first servo system (e.g., CPU 301, read/write channel 137, head amplifier 320, coarse position control circuit 317, and voice-coil motor 128) performs coarse positioning of a read/write head 127 over a corresponding recording surface 112, during which CPU 301 determines an appropriate current to drive through the voice coil of voice coil motor 128. Typically, the appropriate current is determined based in part on a position feedback signal of the read/write head 127, i.e., a position error signal (PES). A second servo system performs fine positioning of a read/write head 127 over a corresponding recording surface 112. The second servo system includes, for example, CPU 301, read/write channel 137, head amplifier 320, one of first fine control circuit 315 or second fine control circuit 316, and one of microactuators 129. During the fine positioning of read/write head 127, CPU 301 determines an appropriate voltage to drive through the appropriate microactuator 129. Typically, the appropriate current for voice coil motor 128 and the appropriate voltage for microactuator 129 are determined based in part on a position feedback signal of the read/write head 127, i.e., a position error signal (PES). The PES is typically generated by using servo patterns included in the servo wedges (see FIG. 4) on the recording surface 112 as a reference. One embodiment of a recording surface 112 is illustrated in FIG. 4.

Figure 4:
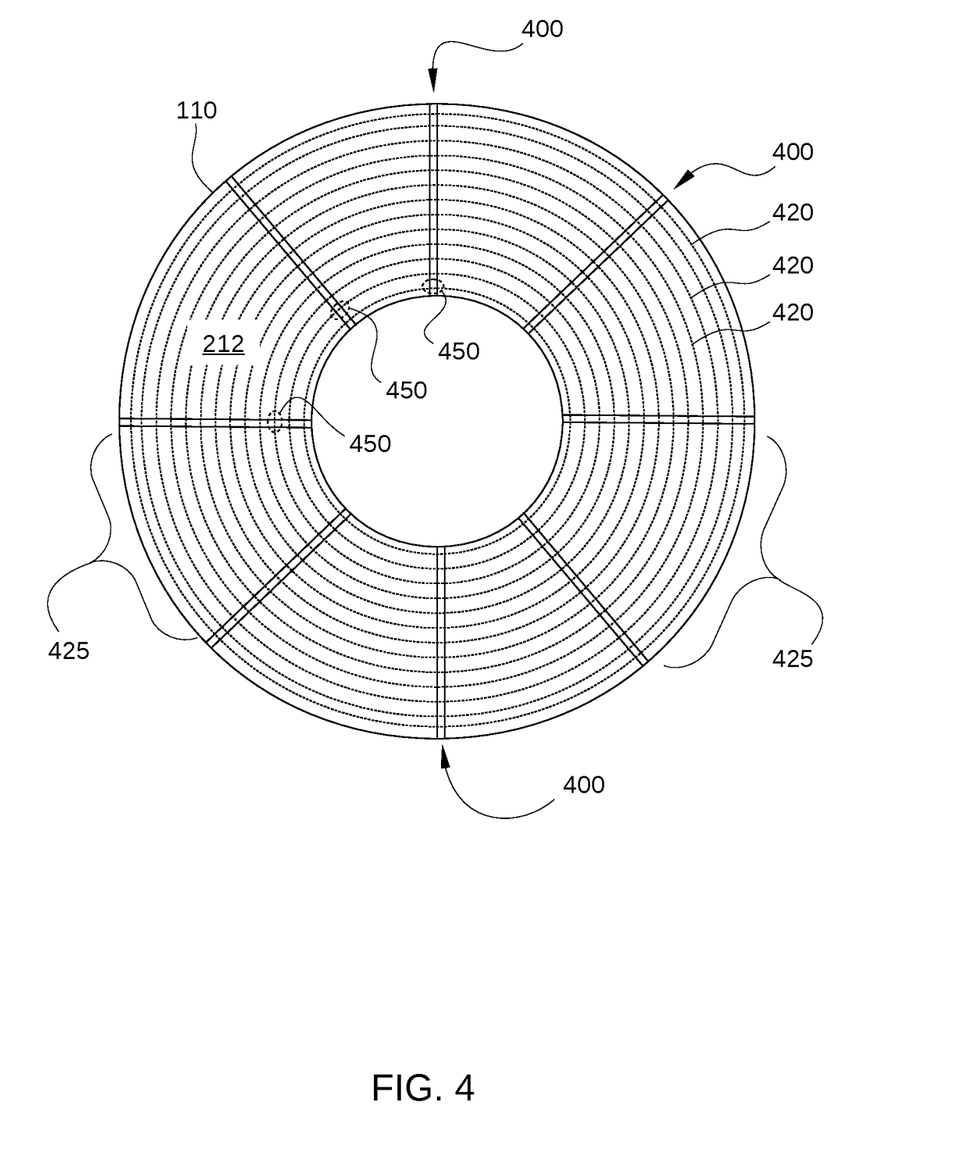
FIG. 4 schematically illustrates one of the recording surfaces of a storage disk with servo wedges and concentric data storage tracks formed thereon, according to an embodiment.

FIG. 4 schematically illustrates one of recording surfaces 112 of a storage disk 110 with servo wedges 400 and concentric data storage tracks 420 formed thereon, according to an embodiment. Servo wedges 400 are written on a first recording surface 112 for one data storage track 420 by the read/write head 127 that corresponds to the recording surface 112 during an SSW process. According to embodiments described herein, servo wedges 400 are written in the SSW process while servo wedges for another data track on another recording surface (not shown) of HDD 100 are written with a different and independently controlled read/write 127 of HDD 100. Thus, in such embodiments, servo wedges can be written simultaneously for two (or more) data storage tracks 420, where each can be on a different recording surface included in HDD 100.

Servo wedges 400 may be substantially radially aligned. In practice, servo wedges 400 may be somewhat curved. For example, servo wedges 400 may be configured in a spiral pattern that mirrors the path that would be followed by read/write head 127 if read/write head 127 were to be moved across the stroke of actuator arm assembly 120 while storage disk 110 is not spinning Such a curved pattern advantageously results in the wedge-to-wedge timing being independent of the radial position of read/write head 127. For simplicity, servo wedges 400 are depicted as substantially straight lines in FIG. 4. Each servo wedge 400 includes a plurality of servo sectors 450 containing servo information that defines the radial position and track pitch, i.e., spacing, of data storage tracks 420.

Data storage tracks 420 for storing data are located in data sectors 425, and are positionally defined by the servo information written in servo sectors 450. Each servo sector 450 contains a reference signal that is written during an SSW process as described herein. Typically, the actual number of data storage tracks 420 and servo wedges 400 included on recording surface 112 is considerably larger than illustrated in FIG. 4. For example, recording surface 112 may include hundreds of thousands of concentric data storage tracks 420 and hundreds of servo wedges 400.

When data are transferred to or from a particular storage disk 110 of HDD 100, actuator arm assembly 120 moves in an arc between the inner diameter (ID) and the outer diameter (OD) of the storage disk 110. Actuator arm assembly 120 accelerates in one angular direction when current is passed in one direction through the voice coil of voice coil motor 128 and accelerates in an opposite direction when the current is reversed, thereby allowing control of the position of actuator arm assembly 120 and the attached read/write head 127 with respect to the particular storage disk 110. As noted above, voice coil motor 128 is included in a first servo system that uses the positioning data read from servo wedges on storage disk 110 by one of read/write heads 127 to determine the position of read/write head 127 over a specific data storage track. Microactuators 129 are included in an additional servo system for fine control of the position of a corresponding read/write heads 127 over the specific data storage track. According to various embodiments, during an SSW process, two (or more) microactuators 129 are included in two (or more) additional servo systems for fine control of the position two (or more) corresponding read/write heads 127 while writing servo wedges 400 in an SSW process. During such an SSW process, position and timing information is read by two (or more) read/write heads 127 from servo spirals. An embodiment of such servo spirals is illustrated in FIG. 5.

Figure 5:
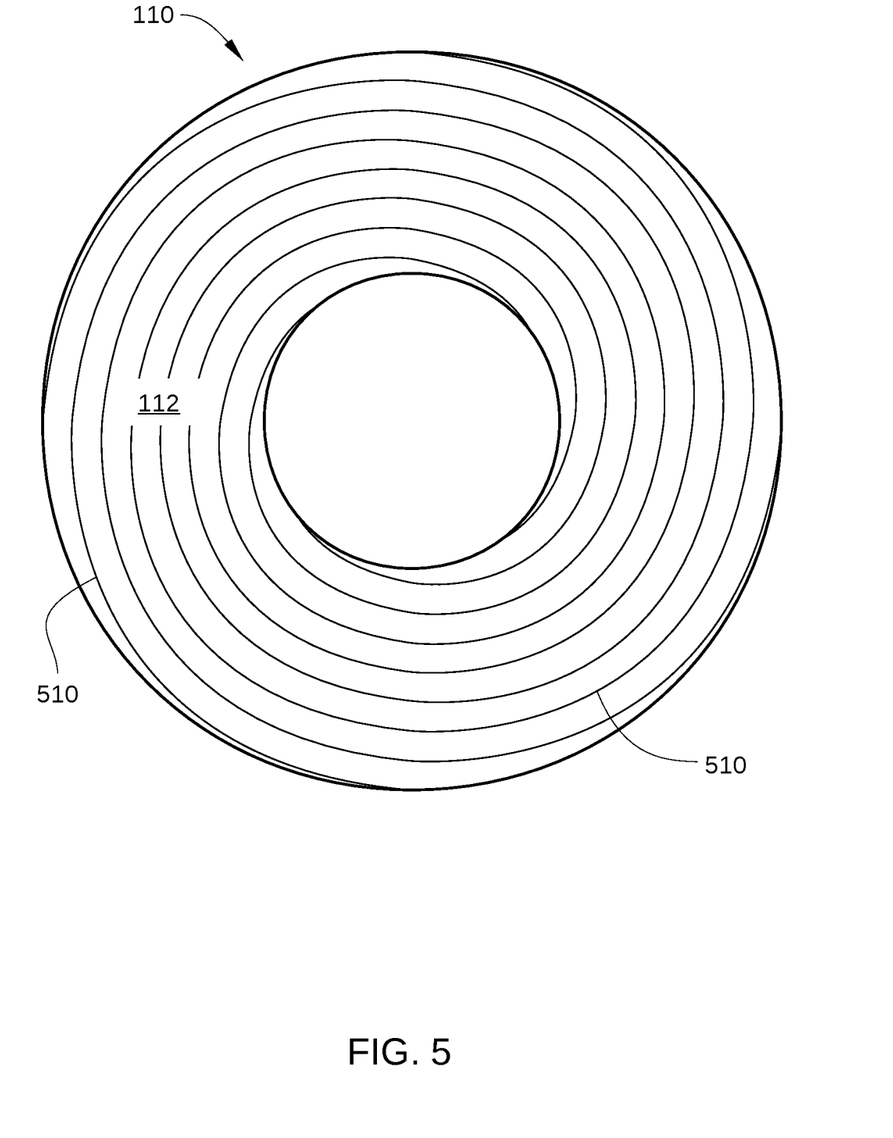
FIG. 5 illustrates a storage disk prior to undergoing a servo self-write process, according to one embodiment.

FIG. 5 illustrates storage disk 110 prior to undergoing a SSW process, according to one embodiment. As shown, storage disk 110 has a plurality of reference spirals 510 that are each circumferentially spaced from adjacent reference spirals 510. It is noted that the number of reference spirals 510 on recording surface 112 for the SSW process described herein is larger than that shown in FIG. 5, for example on the order of several hundred.

Figure 6:
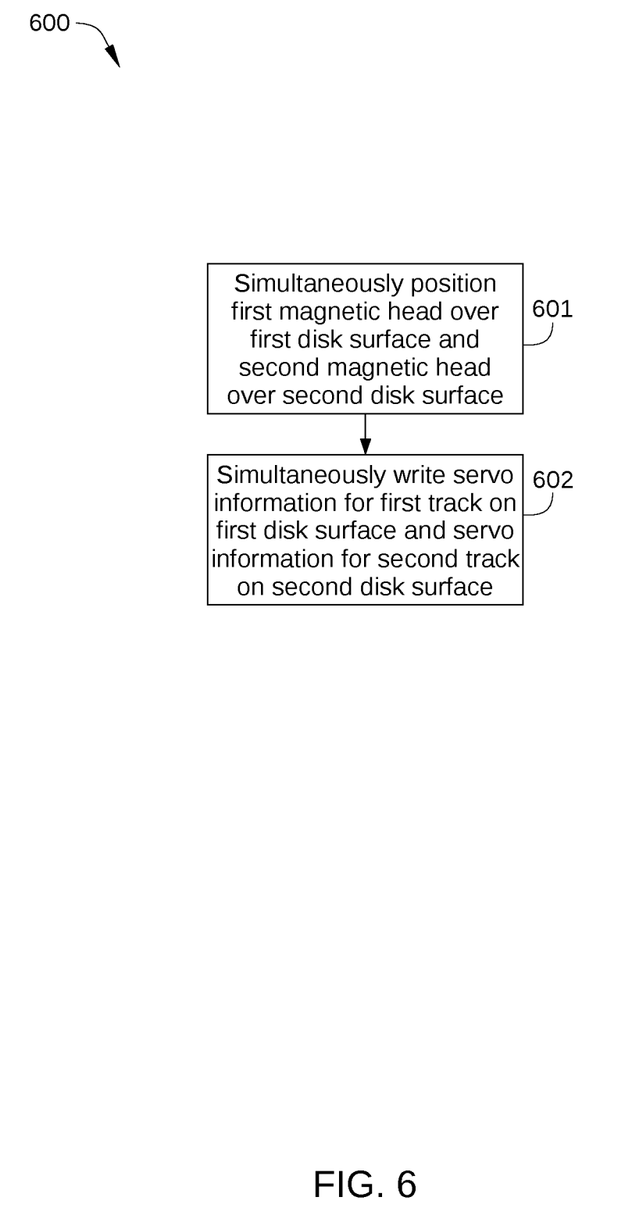
FIG. 6 sets forth a flowchart of method steps for writing servo information in an HDD that includes a voice-coil motor configured for coarse positioning of a first magnetic head and a second magnetic head, according to an embodiment.

FIG. 6 sets forth a flowchart of method steps for writing servo information in an HDD that includes a voice-coil motor configured for coarse positioning of a first magnetic head and a second magnetic head, according to an embodiment. Although the method steps are described in conjunction with HDD 100 in FIGS. 1-5, persons skilled in the art will understand that the method steps may be performed with other types of systems. The control algorithms for the method steps reside in microprocessor-based controller 133 in whole or in part as software- or firmware-implemented logic, and/or as hardware-implemented logic circuits.

Prior to the method steps, the recording surfaces 212A-212F have reference spirals 510 written thereon. In some embodiments, reference spirals 510 are written by an external media writer, and in other embodiments, reference spirals 510 are written by read/write heads 227A-227F, using any technically feasible spiral writing algorithm.

As shown, a method 600 begins at step 601, when microprocessor-based controller 133 simultaneously positions a first magnetic head (one of read/write heads 127) over a first recording surface 112 of HDD 100 and a second magnetic head (another of read/write heads 127) over a second recording surface 112 of HDD 100. Specifically, a coarse positioning servo system (CPU 301, read/write channel 137, head amplifier 320, coarse position control circuit 317, and voice-coil motor 128) positions actuator arms 124 so that the first magnetic head and the second magnetic head are each positioned in a suitable radial location for writing servo wedges 400 for a different data storage track 420 on a different recording surface of HDD 100. A first fine positioning servo system (CPU 301, read/write channel 137, head amplifier 320, first fine control circuit 315, and the microactuator 129 corresponding to the first magnetic head) performs fine positioning of the first magnetic head while a second fine positioning servo system (CPU 301, read/write channel 137, head amplifier 320, second fine control circuit 316, and the microactuator 129 corresponding to the second magnetic head) performs fine positioning of the second magnetic head.

The coarse positioning servo system, first fine positioning servo system, and second fine positioning servo system each acquire timing and position information from reference spirals 510. It is noted that the first fine positioning servo system and the second fine positioning servo system each acquire timing and position information from reference spirals 510 on different recording surfaces of HDD 100. Thus, the first magnetic head is independently positioned, via the first microactuator 129, from the position of the second magnetic head and vice-versa. That is, the first microactuator 129 precisely positions the first magnetic head over a data track location on the first recording surface while the second microactuator 129 precisely positions the second magnetic head over a data track location on the second recording surface. The range of motion of microactuators 129 can be on the order of about 10 to 100 nm, which is sufficient to compensate for perturbations (non-repeatable runout) in the relative radial position of the first magnetic head and the second magnetic head, particularly when the first magnetic head and the second magnetic head are adjacent or otherwise proximate each other. Thus, the first magnetic head and the second magnetic head can each be independently positioned over a respective data storage track 420 with sufficient accuracy for writing servo wedges 400. For example, relative motion between read/write heads 227A and 227B in FIG. 2 is generally less than the range of motion of microactuators 129. Similarly, relative motion between read/write heads 227C and 227D in FIG. 2 is generally less than the range of motion of microactuators 129, and relative motion between read/write heads 227E and 227F in FIG. 2 is generally less than the range of motion of microactuators 129.

In embodiments in which read/write channel 137 includes a single read channel, the first magnetic head and the second magnetic head cannot read position information simultaneously. In such embodiments, reference spirals 510 on the recording surface corresponding to the first magnetic head can be written to be offset from reference spirals 510 on the recording surface corresponding to the second magnetic head. Thus, the first magnetic head and the second magnetic head do not generate a position signal simultaneously, and the single read channel can decode position signals from the two magnetic heads in a staggered fashion.

In step 602, while the first fine positioning servo system positions the first magnetic head over the current data track location on the first recording surface, microprocessor-based controller 133 causes servo information, i.e., servo wedges 400, to be written for the current data track on the first recording surface. Simultaneously, the second fine positioning servo system positions the second magnetic head over the current data track location on the second recording surface, and microprocessor-based controller 133 causes servo information, i.e., servo wedges 400, to be written for the current data track on the second recording surface.

In some embodiments, an independent control connection is provided for each of microactuators 129, so that each microactuator 129 can be actuated independently of the other microactuators 129 of HDD 100. Thus, in such embodiments, more than two independent fine positioning servo systems can be implemented, and therefore servo wedges 400 can be simultaneously written on more than two recording surfaces of HDD 100. Due to constraints of physical space and cost, in some embodiments, a number of connections is reduced at the interface between printed circuit board 132 and the flex-cable that brings signal wires to microactuators 129 and read/write heads 127. Therefore, instead of one control wire connection at the interface for each of microactuators 229A-229F, in some embodiments, a first control wire connection is electrically coupled to a first bank of microactuators 129 (for example microactuators 229A, 229C, and 229E) and a second control wire connection is electrically coupled to a second bank of microactuators 129 (for example microactuators 229A, 229C, and 229E). One such embodiment is illustrated in FIG. 7.

Figure 7:
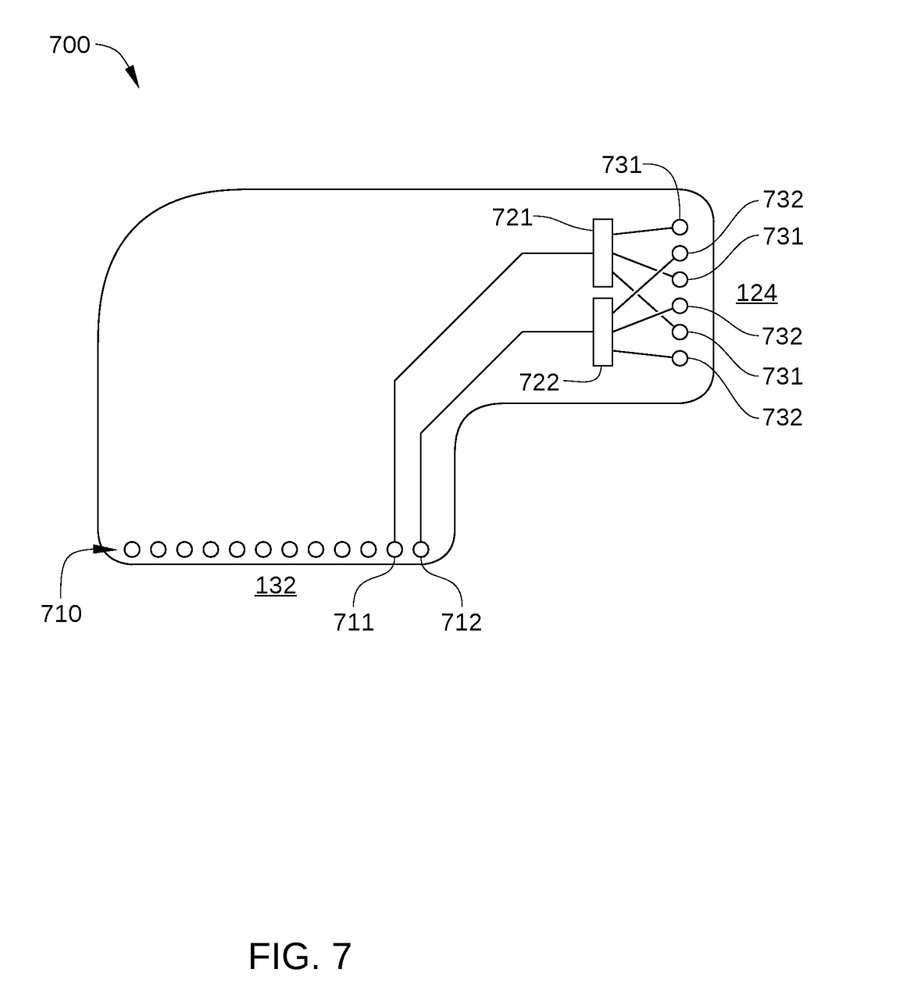
FIG. 7 schematically illustrates a flexible printed circuit board connecting printed a circuit board and microactuators of a hard disk drive, according to an embodiment.

FIG. 7 schematically illustrates a flexible printed circuit board (FPCB) 700 connecting printed circuit board 132 and microactuators 129, according to an embodiment. As shown, FPCB 700 includes a plurality of connections 710 for electrical connection to printed circuit board 132. Connections 710 include a first microactuator connection 711 and a second microactuator connection 712, as well as connections for various other components of actuator arm assembly 120, such as read/write heads 127, sliders 121, dynamic fly-height heaters, and the like. First microactuator connection 711 is electrically coupled to a first bus 721, which is in turn electrically coupled to connection points 731 for half of the microactuators of HDD 100, for example, microactuators 229A, 229C, and 229E. Second microactuator connection 712 is electrically coupled to a second bus 722, which is in turn electrically coupled to connection points 732 for the other half of the microactuators of HDD 100, for example, microactuators 229B, 229D, and 229F. Thus, only two of connections 710 are needed to enable simultaneous independent control of two microactuators 129 during the SSW process. Alternatively, FPCB 700 can be configured with three (or more) connection buses, thereby enabling simultaneous independent control of three (or more) microactuators 129 during the SSW process, further reducing SSW process time.

In sum, embodiments enable an SSW process in which two or more microactuators independently control the position of two or more read/write heads. Thus, in a dual-stage servo system, a first fine positioning servo system independently controls the position of a first read/write head over a first recording surface of an HDD, while a second fine positioning servo system independently controls the position of a second read/write head over a second recording surface of HDD 100.

While the foregoing is directed to embodiments of the present invention, other and further embodiments of the invention may be devised without departing from the basic scope thereof, and the scope thereof is determined by the claims that follow.

We claim:

1. A disk drive comprising:
a first disk having a first disk surface;
a second disk having a second disk surface different from the first disk surface;
one or more actuator arms;
a first magnetic head provided at an end of one of the one or more actuator arms so as to face the first disk surface;
a second magnetic head provided at an end of one of the one or more actuator arms so as to face the second disk surface;
a motor configured to move the one or more actuator arms along the first and second disk surfaces;
a first microactuator configured to move the first magnetic head along the first disk surface;
a second microactuator configured to move the second magnetic head along the second disk surface; and
a control circuit electrically connected to the first and second microactuators via first and second buses and configured to:
perform coarse positioning by controlling the motor to move the one or more actuator arms;
perform fine positioning by controlling the first microactuator to move the first magnetic head to a first position on the first disk surface based on reference information written on the first disk surface while controlling the second microactuator to move the second magnetic head to a second position on the second disk surface based on reference information written on the second disk surface; and
perform servo writing by controlling the first magnetic head to write first servo information at the first position while controlling the second magnetic head to write second servo information at the second position, wherein
the first and second buses are provided on a same flexible printed circuit board.

2. The disk drive according to claim 1, wherein the first and second magnetic heads are provided at different actuator arms.

3. The disk drive according to claim 1, wherein the control circuit includes a first fine control circuit configured to control the first microactuator to move along the first disk surface, and a second fine control circuit configured to control the second microactuator to move along the second disk surface.

4. The disk drive according to claim 3, wherein
the first fine control circuit is electrically connected to the first microactuator via the first bus, and not electrically connected to the second microactuator, and
the second fine control circuit is electrically connected to the second microactuator via the second bus, and not electrically connected to the first microactuator.

5. The disk drive according to claim 3, wherein the control circuit further includes a coarse position control circuit configured to control the motor to move along the first and second disk surfaces.

6. The disk drive according to claim 1, wherein the first position is a first radial position on the first disk surface and the second position is a second radial position on the second disk surface.

7. The disk drive according to claim 1, wherein the control circuit includes a first read channel configured to decode a first read signal read with the first magnetic head and a second read channel configured to decode a second read signal read with the second magnetic head.

8. The disk drive according to claim 1, wherein the control circuit includes a first write channel configured to encode first input data into first write data be written with the first magnetic head and a second write channel configured to encode second input data into second write data to be written with the second magnetic head.

9. The disk drive according to claim 1, wherein the control circuit includes a read channel configured to alternately decode a first read signal read with the first magnetic head and a second read signal read with the second magnetic head.

10. The disk drive according to claim 1, wherein the control circuit includes a write channel configured to encode first input data into first write data be written with the first magnetic head and second input data into second write data to be written with the second magnetic head.

11. A disk drive comprising:
a first disk having a first disk surface;
a second disk having a second disk surface different from the first disk surface;
an actuator arm;
a first magnetic head provided at an end of the actuator arm so as to face the first disk surface;
a second magnetic head provided at the end of the actuator arm so as to face the second disk surface;
a motor configured to move the actuator arm along the first and second disk surfaces;
a first microactuator configured to move the first magnetic head along the first disk surface;
a second microactuator configured to move the second magnetic head along the second disk surface; and
a control circuit electrically connected to the first and second microactuators via first and second buses and configured to:
perform coarse positioning by controlling the motor to move the actuator arm;
perform fine positioning by controlling the first microactuator to move the first magnetic head to a first position on the first disk surface based on reference information written on the first disk surface while controlling the second microactuator to move the second magnetic head to a second position on the second disk surface based on reference information written on the second disk surface; and perform servo writing by controlling the first magnetic head to write first servo information at the first position while controlling the second magnetic head to write second servo information at the second position, wherein the first and second buses are provided on a same flexible printed circuit board.

12. The disk drive according to claim 11, further comprising:
a second actuator arm;
a third magnetic head provided at an end of the second actuator arm so as to face a third disk surface of the first disk that is opposite to the first disk surface; and
a third microactuator configured to move the third magnetic head along the third disk surface, wherein
the motor is further configured to move the second actuator arm along the third disk surface,
during the coarse positioning, the motor also moves the second actuator arm,
during the fine positioning, the control circuit controls the third microactuator to move the third magnetic head to a third position on the third disk surface, and
during the servo writing, the control circuit controls the third magnetic head to write third servo information at the third position while controlling the first and second magnetic heads to write the first and second servo information, respectively.

13. The disk drive according to claim 12, wherein the control circuit includes a first fine control circuit configured to control the first microactuator to move along the first disk surface, and a second fine control circuit configured to control the second and third microactuators to move along the second and third disk surfaces, respectively.

14. The disk drive according to claim 13, wherein
the first fine control circuit is electrically connected to the first microactuator via the first bus, and not electrically connected to the second and third microactuators, and
the second fine control circuit is electrically connected to the second and third microactuators via the second bus, and not electrically connected to the first microactuator.

15. The disk drive according to claim 12, further comprising:
a third actuator arm;
a fourth magnetic head provided at an end of the third actuator arm so as to face a fourth disk surface of the second disk that is opposite to the second disk surface; and
a fourth microactuator configured to move the fourth magnetic head along the fourth disk surface, wherein
the motor is further configured to move the third actuator arm along the fourth disk surface,
during the coarse positioning, the motor also moves the third actuator arm,
during the fine positioning, the control circuit controls the third microactuator to move the fourth magnetic head to a fourth position on the fourth disk surface, and
during the servo writing, the control circuit controls the fourth magnetic head to write fourth servo information at the fourth position while controlling the first, second, and third magnetic heads to write the first, second, and third servo information, respectively.

16. The disk drive according to claim 15, wherein the control circuit includes a first fine control circuit configured to control the first and fourth microactuators to move along the first and fourth disk surfaces, respectively, and a second fine control circuit configured to control the second and third microactuators to move along the second and third disk surfaces, respectively.

17. The disk drive according to claim 16, wherein
the first fine control circuit is electrically connected to the first and fourth microactuators via a first bus, and not electrically connected to the second and third microactuators, and
the second fine control circuit is electrically connected to the second and third microactuators via a second bus, and not electrically connected to the first and fourth microactuators.

18. The disk drive according to claim 17, wherein the first bus and the second bus are provided on a same flexible printed circuit board.

* * * * *